United States Patent Office 3,597,487
Patented Aug. 3, 1971

3,597,487
CHAIN GROWTH OF ORGANO-MAGNESIUM COMPOUNDS
Lawrence H. Shepherd, Jr., Baton Rouge, La., assignor to Ethyl Corporation, New York, N.Y.
No Drawing. Filed Feb. 25, 1969, Ser. No. 802,267
Int. Cl. C07f 3/02
U.S. Cl. 260—665R    23 Claims

ABSTRACT OF THE DISCLOSURE

Hydrocarbyl magnesium compounds (e.g., RMgX, $R_2Mg$) undergo a chain growth reaction with ethylene or other normally gaseous monoolefins provided the reaction is performed in an essentially non-complexing solvent—i.e., a solvent which is weakly basic relative to the hydrocarbyl magnesium reactant. Such solvents include paraffinic hydrocarbons, cycloparaffiinic hydrocarbons, aromatic hydrocarbons, and ethers having a basicity less than that of diethyl ether (e.g., diisopropyl ether).

This invention relates to the preparation of organomagnesium compounds. More particularly this invention is concerned with the chain growth of organomagnesium compounds.

BACKGROUND

As is well known, Ziegler and his colleagues have discovered that certain organometallic compounds will undergo a progressive intermolecular addition reaction with ethylene and like low molecular weight olefinic compounds, a process which is often referred to as "chain growth." For example Ziegler and Gellert in U.S. Pat. 2,826,598 describe the chain growth reaction as applied to aluminum alkyls and beryllium alkyls. In U.S. Pat. 2,975,215 Ziegler, Koster, and Kroll describe the chain growth of boron alkyls with ethylene using aluminum trialkyls as catalysts.

U.S. Pat. 3,404,194 to Crain and Reusser discloses that organomagnesium halide compounds obtained by heating an ether solution of an organomagnesium halide to drive off the ether can be mixed with an organolithium compound to form a catalyst which may be used for converting ethylene to higher hydrocarbons, principally 1-olefins.

An advantage of the aluminum alkyl chain growth reaction is that it enables the production of higher molecular weight aluminum alkyls from the lower molecular weight members at relatively low cost. For example ethylene addition to triethylaluminum produces long chain aluminum alkyls which, on oxidation and hydrolysis, yield alcohols. Commercial processes for the production of detergent range alcohols ($C_{12}$–$C_{16}$) are based in part on this technology.

Ziegler, Koster and Grimme point out in U.S. Pat. 3,217,020 that the production of higher molecular weight alkyl magnesium compounds remains a problem which has not been satisfactorily solved technically. More particularly, they note that a chain growth reaction analogous to the aluminum trialkyl chain growth reaction is unknown for magnesium alkyls and that although magnesium alkyls react with ethylene, a product composed predominantly of polyethylene is formed, there being no formation of reaction products comparable to the synthesis products of limited carbon number which are formed when chain growing aluminum trialkyls.

THE INVENTION

This invention involves, inter alia, the discovery that organomagnesium halides (Grignard reagents) and alkenyl magnesium compounds will undergo a chain growth reaction to form higher molecular organomagnesium compounds provided that the reaction is conducted in a suitable reaction medium. To achieve this new result the reaction is performed in an essentially non-complexing solvent—i.e., a solvent which is weakly basic relative to the organomagnesium reactant. Although the matter of chemical basicity is for all practical purposes a continuum, solvents or diluents which are compatible with organomagnesium compounds and have a basicity less than that of diethyl ether will be found appropriate for use in this invention. As is well known, solvents or diluents of this character include paraffinic, cycloparaffinic, and aromatic hydrocarbons and such ethers as anisole, phenetole, diisopropyl ether, and the like. See for example Hamelin, Bull. soc. chim. France, 1961, 684–92 and Hamelin and Hayes, ibid. 692–7.

The practice and advantages of this invention will become still further apparent from the following illustrative example.

EXAMPLE

Chain growth of butyl magnesium bromide n-Butyl magnesium bromide was prepared in diisopropyl ether by stirring and gently refluxing a system composed of about 10 ml. n-butyl bromide, 100 ml. diisopropyl ether, 0.5 ml. diethyl ether and 10 g. magnesium turnings. A crystal of iodine and a few drops of ethylene dibromide had also been added to the system in order to facilitate reaction initiation. A portion of the resultant solution was hydrolyzed and n-butane was identified in the hydrolysis gas.

The butyl magnesium bromide/diisopropyl ether solution was pressurized to 1,000 p.s.i. with ethylene and held at 150° C. for 3 hours. A portion of the recovered reaction product was hydrolyzed and the liberated components identified by VPC. These were found to be n-butane, n-hexane, n-octane, n-decane, and n-dodecane.

Another portion of the product solution was subjected to oxidation by bubbling oxygen through the solution at about 0° C. Thereupon the system was hydrolyzed and the liberated alcohols were analyzed by VPC. The distribution was as follows:

| Liberated alkanols: | Mole percent |
|---|---|
| n-Butanol | 63 |
| n-Hexanol | 28 |
| n-Octanol | 7 |
| n-Decanol | 2 |
| n-Dodecanol | 0.4 |

The foregoing example illustrates the fact that hydrocarbyl Grignard reagents readily undergo a chain growth reaction pursuant to this invention. Similar results are achieved when using other hydrocarbyl magnesium compounds, other normally gaseous olefins, or other essentially non-complexing compatible reaction media. For example allyl magnesium bromide readily undergoes chain growth reaction in diisopropyl ether containing traces of diethyl ether when treated with ethylene at 150° C. and 2500 p.s.i. for 2 hours. Similarly treatment of 4-pentenyl magnesium bromide with ethylene in anisole at 150° C. and 2500 p.s.i. for 2 hours likewise results in substantial chain growth.

As noted above, hydrocarbons which are liquid under the reaction conditions are useful solvents in the present process. These may be paraffinic, cycloparaffinic, or aromatic in character and may be used singly or in various combinations. Aromatic hydrocarbons, especially mononuclear aromatics, are preferred for use when chain growing with ethylene, a reaction which is normally conducted at superatmospheric pressure. Thus suitable hydrocarbon solvents include pentanes, hexanes, heptanes, octanes, nonanes, decanes, petroleum ether, cyclohexane, methylcyclohexane, dimethylcyclohexanes, ethylcyclohexane, cyclooctane, decahydronaphthalene and the like. Exemplary aromatic hydrocarbon solvents include benzene, toluene, xylenes, mesitylenes, durene, ethyl benzene, isopropyl benzene, cymene, naphthalene, 1-methyl naphthalene, 2-methyl naphthalene, biphenyl, tetrahydronaphthalene, and the like. The presence of substituents in the hydrocarbons is not prejudicial provided the substituents are sufficiently inert chemically as not to interfere with the desired reaction. Thus the presence in the hydrocarbon of innocuous substituents such as trimethylsilyl, triphenylsilyl, sulfur (in the form of alkyl sulfides), nitrogen (in the form of weakly basic tertiary amines), etc., may be found acceptable.

Ethers having a chemical basicity (vis-a-vis hydrocarbyl magnesium compounds) less than that of diethyl ether are likewise suitable for use in the present process. Thus recourse may be had to such reaction solvents or diluents as diisopropyl ether, anisole, phenetole, diphenyl ether, phenyl isopropyl ether, and the like.

As a general rule the Grignard reagents will be subjected to the chain growth reaction in a reaction medium composed predominantly of an essentially non-complexing (weakly basic) ether of the type referred to above although if desired the reaction may be performed in a hydrocarbon medium. On the other hand, the dihydrocarbyl magnesium reactants are usually chain grown in accordance with the invention in a reaction medium composed predominantly of a suitable paraffinic, cycloparaffinic or aromatic hydrocarbon, although the use of a weakly basic ether is feasible. It will of course be appreciated that the reaction medium in which the process is conducted can be composed of mixtures of hydrocarbons and ethers of this character. Moreover, small quantities of more basic substances such as diethyl ether, triethyl amine, pyridine, tetrahydrofuran, and the like may be present within the reaction medium provided, however, that they are present in sufficiently small amount as not to prevent or markedly inhibit the desired chain growth reaction. As a general proposition, the lower the amount of such strongly basic substance the better. However in some cases, e.g., when the hydrocarbyl magnesium reactant is best prepared in, say, diethyl ether, it may not be practicable to remove the last traces of the diethyl ether before utilizing the magnesium reagent in the present chain growth reaction. Fortunately, however, small amounts of these strongly basic substances are not prejudicial—note the example.

The suitability of any given solvent or diluent for use in the present process can readily be ascertained by means of a simple pilot experiment.

Various organomagnesium compounds may be used in the present process—e.g., they may be either Grignard reagents or diorganomagnesium compounds. Mixtures of a Grignard reagent and its corresponding diorganomagnesium compound may also be employed. Indeed some investigators have suggested that a Grignard reagent involves an equilibrium between the oranomagnesium halide and a mixture of the magnesium dihalide and diorganomagnesium.

Poly Grignard reagents—i.e., Grignard reagents prepared from polyhaloalkanes such as 1,4-dibromobutane may also be subjected to chain growth in accordance with this invention, leading to alpha-, omega-difunctional organic products.

Other preferred hydrocarbyl magnesium compounds are those in which the hydrocarbyl groups are alkenyl groups, especially where the double bond does not involve the alpha carbon atom. Allylic magnesium compounds, especially allyl Grignard reagents are particularly reactive and suitable for use in the present process. Other suitable magnesium compounds include the aralkyls, the cycloalkyls, the alkynyls and the like.

Accordingly, some of the hydrocarbyl magnesium compounds which may be subjected to the process of this invention are methyl magnesium chloride, methyl magnesium bromide, methyl magnesium iodide, ethyl magnesium chloride, ethyl magnesium bromide, ethyl magnesium iodide, propyl magnesium chloride, propyl magnesium bromide, propyl magnesium iodide, isopropyl magnesium chloride, isopropyl magnesium bromide, isopropyl magnesium iodide and similar homologous Grignard reagents including those having up to about 18 or more carbon atoms in the molecule, butane 1,4-dimagnesium chloride, butane 1,4-dimagnesium bromide, pentane 1,5-dimagnesium bromide, hexane 1,6-dimagnesium iodide, benzyl magnesium bromide, phenethyl magnesium chloride, allyl magnesium bromide, allyl magnesium chloride, allyl magnesium iodide, diallyl magnesium, crotyl magnesium chloride, 4-pentenyl magnesium iodide, cyclohexyl magnesium bromide, and the like. If desired, mixtures of hydrocarbyl magnesium compounds may be used.

The other reactant employed in the present process is preferably ethylene although use may be made of other normally gaseous monoolefins such as propylene, butene-1, butene-2 and isobutylene. These olefins may be substantially pure or they may be associated with inerts such as normally gaseous paraffins.

The chain growth reaction of the present invention should be conducted at suitably elevated temperatures and pressures, that is temperatures and pressures which are sufficient to effect the desired reaction at an appropriate reaction rate without incurring excessive decomposition of the desired hydrocarbyl magnesium product. Although the temperatures and pressures will vary to some extent depending upon the nature of the reactants and reaction medium being employed, temperatures within the range of from about 50 to about 250° C. will generally be found suitable. Temperatures in the range of from about 125 to about 175° C. are preferred. The reaction will usually be run under superatmospheric pressures ranging from about 200 up to about 5,000 p.s.i.g. or more. When using an ethylene as the olefin reactant, pressures in the range of from about 2,000 to about 3,000 p.s.i.g. are particularly suitable.

As in the case of the alkyl aluminum chain growth reaction, it is not feasible to carry out the individual stages of building up the final compound on a highly selective basis, since the additions to the hydrocarbyl groups tend to take place both successively and concurrently. Accordingly, the reaction product will normally be composed of a mixture of chain grown hydrocarbyl magnesium product with a generally random distribution. However, a feature of this invention is the fact that the addition of the hydrocarbyl magnesium compound to some extent always goes beyond the addition of one or two olefinic units per initial hydrocarbyl group. Thus in the case of ethylene chain growth, at least a portion of the initial hydrocarbyl groups will be grown by at least 6 carbon atoms. The extent to which this growth proceeds will be determined to a degree by the reactivity of the hydrocarbyl magnesium reactant employed, the makeup of the reaction medium used, the severity of the reaction conditions employed and the proportion of the olefinic reactant relative to the hydrocarbyl magnesium reactant.

It will also be apparent that the art is provided with new compositions of organomagnesium compounds. The most useful of these are the mixtures of hydrocarbyl magnesium compounds based on chain growth using ethylene. In particular, this invention provides a mixture of hydrocarbyl magnesium compounds in which there are present at least four homologous hydrocaryl groups differing from each other by consecutive multiples of $C_2H_4$. By way of example these mixtures may involve mixtures of hydrocarbyl Grignard reagents collectively represented by the general formula:

$$R(C_2H_4)_nMgX \qquad (I)$$

wherein $n$ is an integer ranging consecutively from 0 up to at least 3, and frequently on up to some higher integer within the range of 4 to about 12 or more, R is a hydrocarbyl group and X is a halogen (chlorine, bromine or iodine). To illustrate, the organomagnesium product of the example consists essentially of n-butyl magnesium bromide, n-hexyl magnesium bromide, n-octyl magnesium bromide, n-decyl magnesium bromide, and n-dodecyl magnesium bromide. In terms of the foregoing general formula R is butyl (the lowest member of the hydrocarbyl groups present) and $n$ involves the consecutive whole integers 0 through 4 inclusive. In short there was a total of about five species present.

Preferred mixtures of hydrocarbyl magnesium compounds of the character described above are those wherein the hydrocarbyl groups are alkyl or alkenyl groups, particularly when the alkyl or alkenyl groups are straight chain groups. Exemplary of such preferred mixtures are the following:

(a) Mixed Grignard reagents where the hydrocarbyl groups include n-butyl, n-hexyl, n-octyl, n-decyl, and n-dodecyl groups. In this composition R (Formula I above) is butyl, X is chlorine, bromine or iodine and $n$ is from 0 to 4 inclusive.

(b) Mixtures of hydrocarbyl Grignard reagents where the hydrocarbyl groups include, inter alia, n-pentyl, n-heptyl, n-nonyl, n-undecyl, n-tridecyl, n-pentadecyl, and n-heptadecyl.

(c) A mixture of hydrocarbyl magnesium compounds in which the hydrocarbyl groups are omega alkenyl groups, for example a mixture of 4-pentenyl magnesium chloride, 6-heptenyl magnesium chloride, 8-nonenyl magnesium chloride, 10-undecenyl magnesium chloride, 12-tridecenyl magnesium chloride, and 14-pentadecenyl magnesium chloride.

This invention also provides the art with compositions composed of a mixture of hydrocarbyl magnesium compounds of the character described above dissolved in a compatible solvent consisting essentially of paraffinic hydrocarbon, cycloparaffinic hydrocarbon, aromatic hydrocarbon, ether having a basicity (relative to the hydrocarbyl magnesium compounds present) less than that of diethyl ether, or any mixture of two or more of the foregoing solvents. In these preferred solutions, the presence of liquid aromatic hydrocarbon solvents is particularly advantageous.

In all of the foregoing compositions the relative proportions of the individual hydrocarbyl magnesium species will follow a general random pattern reminiscent of the Poisson distribution curve or at least a segment thereof. In the hydrocarbon and/or ether solutions provided by this invention the concentration of the mixture of hydrocarbyl magnesium compounds may of course vary depending upon the solubility of the individual organomagnesium species in the particular solvent being utilized. The primary requirement is that there be present at least about 2 mole percent of each of at least four homologous compounds differing from each other by consecutive additions of $C_2H_4$ groups.

If desired, the chain growth reactions of this invention may be conducted in the presence of a small, catalytic quantity of an organoaluminum compound such as trialkyl aluminum or the like. It is also possible to perform concurrent chain growth reactions utilizing a system containing substantial proportions of both hydrocarbyl magnesium compound(s) and hydrocarbyl aluminum compound(s) under the reaction conditions described herein.

The chain grown hydrocarbyl magnesium compounds producible by this invention are of particular use as intermediates to desirable products of commerce. For example, the chain grown hydrocarbyl magnesium compounds may be readily oxidized with oxygen or air and thereupon hydrolyzed so as to produce the corresponding alcohols. Thus plasticizer and detergent range alcohols may be synthesized by means of the present process. Alternatively the chain grown hydrocarbyl magnesium products may be treated with carbon dioxide and then readily converted by hydrolysis into carboxylic acids such as the fatty acids. Also, olefins may be produced on the basis of the present process, in particular by treating the chain grown hydrocarbyl magnesium compounds with an olefin (usually of lower molecular weight than the desired product) under elevated temperature conditions to effect displacement of the hydrocarbyl groups (as olefins) by the displacing olefin. In general, the products producible by the methods of this invention can be utilized in the same type of chemical reactions as conventional Grignard reagents prepared by other means.

If desired, some of the organomagnesium products producible by the process of this invention may be recovered and used as such as components of catalyst systems, e.g., for the production of polyethylene or polypropylene by techniques discovered by Ziegler, Natta and their colleagues. In most cases, however, the organomagnesium products prepared in accordance with this invention will not be recovered and isolated as such. Rather, they will be utilized primarily as intermediates for further chemical reaction.

Some of the products producible by means of the present technology cannot be prepared readily by previously known technology. For example, chain growth of an allyl magnesium compound (e.g., allyl magnesium chloride or bromide) with ethylene followed by carbonation (treatment with carbon dioxide) and hydrolysis (e.g., with aqueous $NH_4Cl$, HCl or etc.) yields a mixture composed predominantly of straight chain omega unsaturated monocarboxylic acids (e.g., 5-hexenoic acid, 7-octenoic acid, 9-decenoic acid, 11-dodecenoic acid, etc.). By the same token chain growth of a crotyl magnesium compound (2-butenyl magnesium bromide) with ethylene followed by carbonation and hydrolysis provides a mixture composed predominantly of branched chain unsaturated monocarboxylic acids with the double bond in the terminal position (e.g., 4-methyl-5-hexenoic acid, 6-methyl-7-octenoic acid, 8-methyl-9-decenoic acid, 10-methyl-11-dodecenoic acid, etc.).

When conducting the process of this invention the usual precautions used in conventional Grignard syntheses will of course be observed. For example, the reaction system will be kept as anhydrous as practicable. In addition, the hydrocarbyl magnesium reactants will not be exposed excessively to the atmosphere.

Methods for the preparation of the hydrocarbyl magnesium reactants of the present process are of course standard and well known in the art. Exemplary of some of the more recent innovative techniques which may be successfully used are those described in U.S. 3,264,360; U.S. 3,426,087; and British 1,135,455. In many cases the hydrocarbyl magnesium reactants of the present invention may be prepared as described in the foregoing references and then the chain growth reaction performed in the same reaction medium.

What is claimed is:

1. A process for the production of higher hydrocarbyl magnesium compounds from hydrocarbyl magnesium compounds of lower molecular weight which comprises reacting ethylene and an aliphatic or cycloaliphatic hydrocarbyl Grignard reagent in an essentially non-complexing compatible reaction medium consisting essentially of paraffinic hydrocarbon, cycloparaffinic hydrocarbon, aromatic hydrocarbon, ether having a basicity less than that of diethyl ether, or any mixture of two or more of the foregoing, said reaction being conducted at a superatmospheric pressure of at least about 200 p.s.i.g. and reaction temperature within the range of about 50 to about 250° C. sufficient to effect the reaction without incurring excessive decomposition of the desired product.

2. A process for the production of higher hydrocarbyl magnesium compounds from hydrocarbyl magnesium compounds of lower molecular weight which comprises reacting ethylene and an alkenyl magnesium compound in an essentially non-complexing compatible reaction medium consisting essentially of paraffinic hydrocarbon, cycloparaffinic hydrocarbon, aromatic hydrocarbon, ether having a basicity less than that of diethyl ether, or any mixture of two or more of the foregoing, said reaction being conducted at a superatmospheric pressure of at least about 200 p.s.i.g. and reaction temperature within the range of about 50 to about 250° C. sufficient to effect the reaction without incurring excessive decomposition of the desired product.

3. The process of claim 1 wherein the reaction is carried out at a temperature within the range of from about 125 to about 175° C.

4. The process of claim 1 wherein the reaction is carried out under superatmospheric pressure in the range of from about 2,000 to about 3,000 p.s.i.g.

5. The process of claim 1 wherein said medium consists essentially of a paraffinic, cycloparaffinic or aromatic hydrocarbon, liquid under the reaction conditions employed.

6. The process of claim 1 wherein said medium consists essentially of a mononuclear aromatic hydrocarbon, liquid under the reaction conditions employed.

7. The process of claim 1 wherein said medium consists essentially of benzene.

8. The process of claim 1 wherein said medium consists essentially of an ether having a basicity relative to the hydrocarbyl magnesium compound less than that of diethyl ether.

9. The process of claim 1 wherein said medium consists essentially of diisopropyl ether.

10. The process of claim 1 wherein said hydrocarbyl Grignard reagent is an alkyl magnesium compound.

11. The process of claim 1 wherein said hydrocarbyl Grignard reagent is a primary alkyl magnesium compound.

12. The process of claim 1 wherein said hydrocarbyl Grignard reagent is a straight chain alkyl magnesium compound.

13. The process of claim 2 wherein said alkenyl magnesium compound is an allyl magnesium compound.

14. The process of claim 1 wherein said hydrocarbyl Grignard reagent is a primary lower alkyl magnesium compound and a portion of the alkyl groups of the reactant are grown by at least six carbon atoms.

15. The process of claim 2 wherein said alkenyl magnesium compound is an allyl magnesium compound and a portion of the allyl groups of the reactant are grown by at least six carbon atoms.

16. A mixture of hydrocarbyl Grignard reagents in which there are present at least four homologous alkyl or alkenyl groups differing from each other by consecutive multiples of $C_2H_4$, each such group containing not more than about 17 carbon atoms, there being present in the mixture at least about 2 mole percent of each of at least four such homologous Grignard reagents.

17. The composition of claim 16 wherein said hydrocarbyl groups are alkyl groups.

18. The composition of claim 16 wherein said hydrocarbyl groups include n-butyl, n-hexyl, n-octyl- n-decyl, and n-dodecyl groups.

19. The composition of claim 16 wherein said hydrocarbyl groups include n-pentyl, n-heptyl, n-nonyl, n-undecyl, n-tridecyl, n-pentadecyl, and n-heptadecyl groups.

20. A mixture of hydrocarbyl magnesium compounds in which there are present at least four homologous omega-alkenyl groups differing from each other by consecutive multiples of $C_2H_4$, each such group containing not more than about 17 carbon atoms, there being present in the mixture at least about 2 mole percent of each of at least four such homologous hydrocarbyl magnesium compounds.

21. The composition of claim 20 wherein said hydrocarbyl groups include 4-pentenyl, 6-heptenyl, 8-nonenyl, 10-undecenyl, 12-tridecenyl, and 14-pentadecenyl groups.

22. A mixture according to claim 16 dissolved in a compatible solvent consisting essentially of paraffinic hydrocarbon, cycloparaffinic hydrocarbon, aromatic hydrocarbon, ether having a basicity relative to said hydocarbyl Grignard reagents less than that of diethyl ether, or any mixture of two or more of the foregoing.

23. A mixture according to claim 20 dissolved in a compatible solvent consisting essentially of paraffinic hydrocarbon, cycloparaffinic hydrocarbon, aromatic hydrocarbon, ether having a basicity relative to said hydocarbyl magnesium compounds less than that of diethyl ether, or any mixture of two or more of the foregoing.

References Cited

Gilman et al.: J. Am. Chem. Soc. 45 (1923) pp. 554–8.

Kharasch et al.: Grignard Reactions of Nonmetallic Substances, Prentice-Hall, Inc., New York, N.Y. 1954, pp. 87–91.

Job et al.: Complete Rend. 179 (1924) pp. 330–1.

Podall et al.: J. Org. Chem. 23 (1958) pp. 1848–52.

TOBIAS E. LEVOW, Primary Examiner

A. P. DEMERS, Assistant Examiner

U.S. Cl. X.R.

252—431; 260—665G